Figure 1:
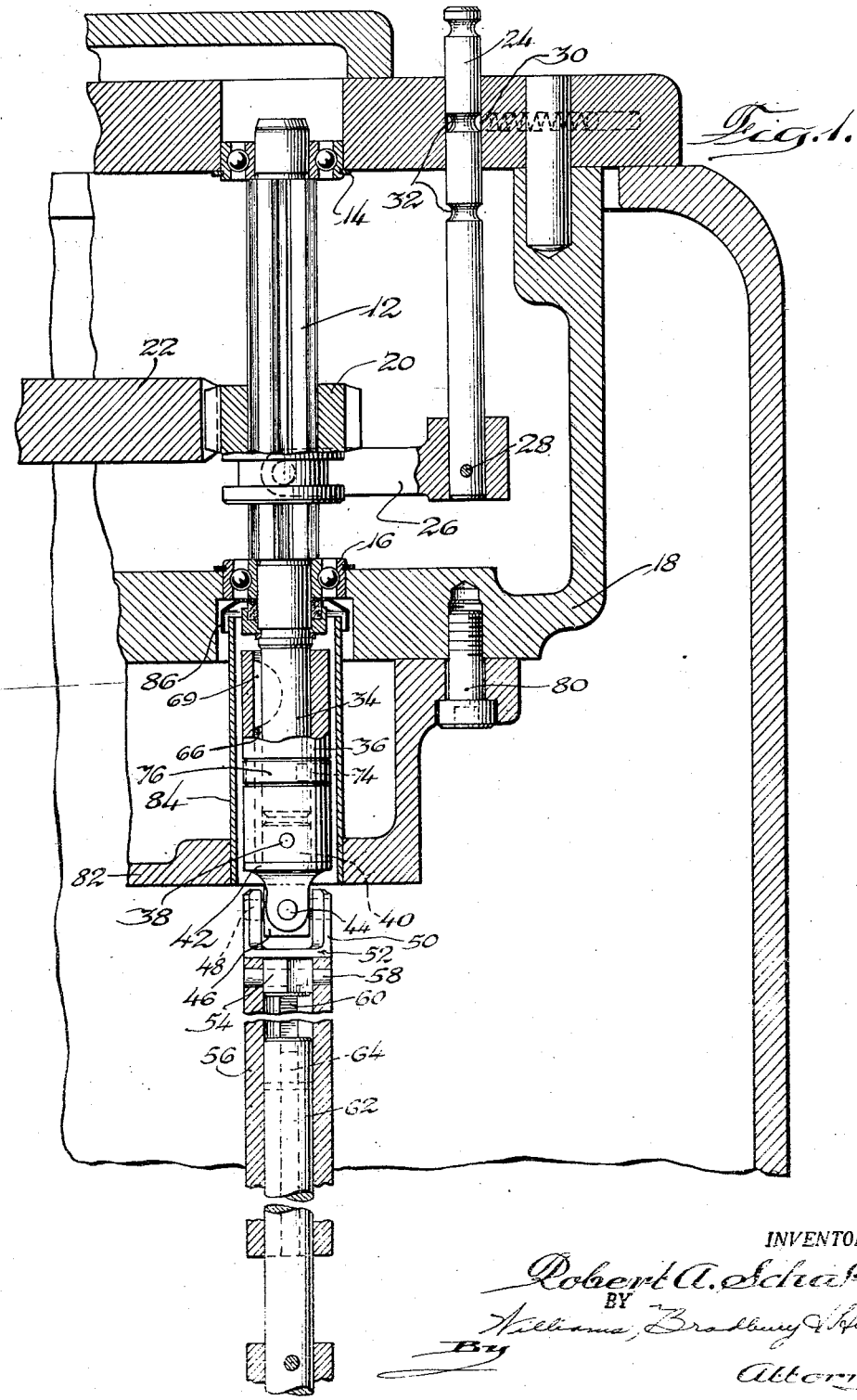

Jan. 11, 1949.  R. A. SCHAFER  2,458,740
MULTIPLE SPINDLE MACHINE TOOL
Filed June 9, 1943  2 Sheets-Sheet 1

INVENTOR:
Robert A. Schafer
BY Williams, Bradbury & Hinkle
Attorneys

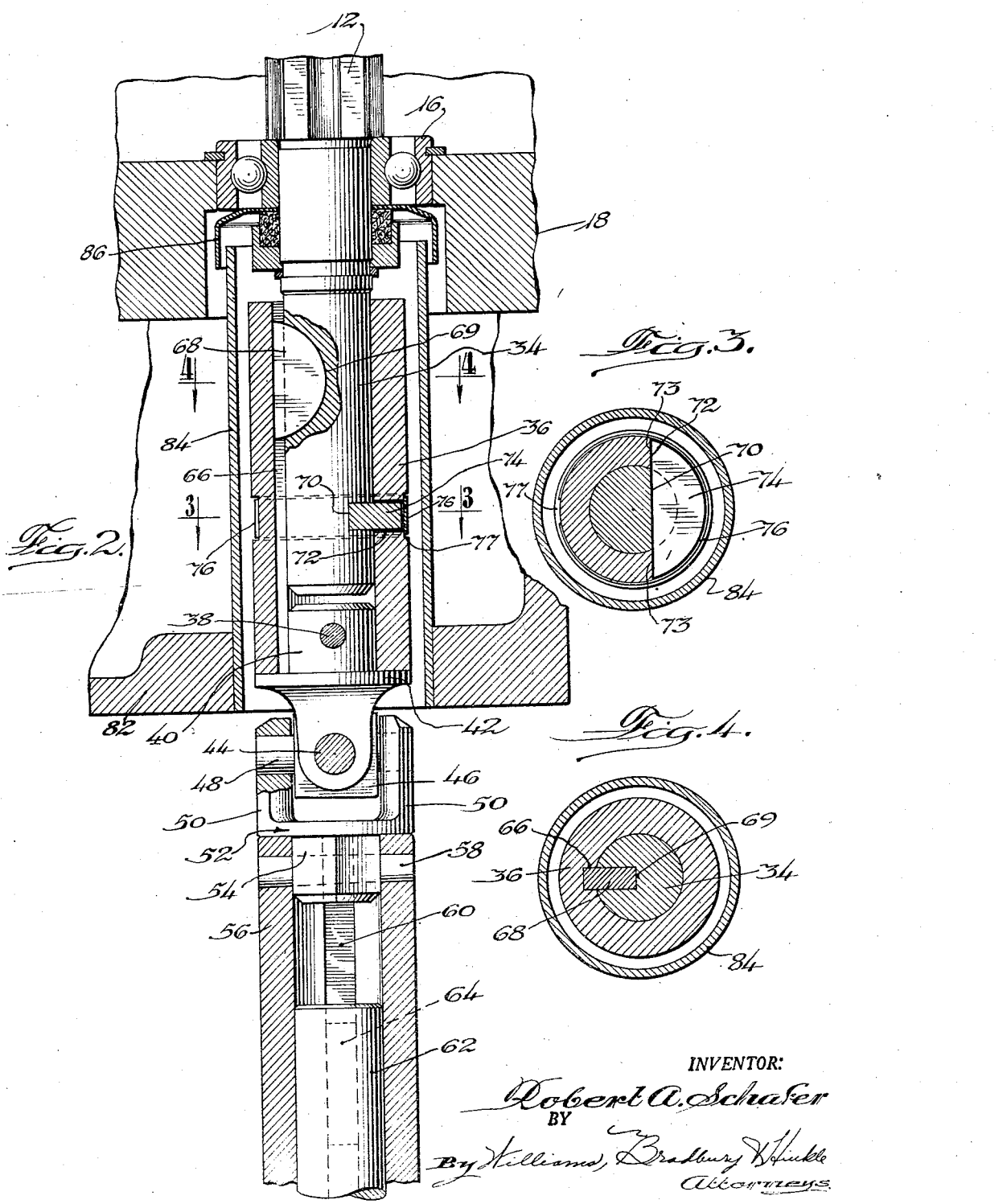

Patented Jan. 11, 1949

2,458,740

UNITED STATES PATENT OFFICE 2,458,740

MULTIPLE SPINDLE MACHINE TOOL

Robert A. Schafer, Richmond, Ind., assignor to National Automatic Tool Company, Inc., Richmond, Ind., a corporation of Indiana Application June 9, 1943, Serial No. 490,167

3 Claims. (Cl. 287—119)

This invention relates generally to multiple spindle machine tools for drilling, tapping, boring and the like, and more particularly to an improved spindle driving connection for such machines.

The primary object of the invention is to increase the ease and convenience with which the setup of a multiple spindle machine may be changed.

In a machine having a plurality of shafts respectively driving tool carrying spindles through universal joints, I propose to provide means for easily and quickly detaching the universal joints and spindles from their respective driving shafts.

A further object is to provide a spindle driving connection which is detachable but which, when in locked position, will not be unlocked by either centrifugal force or vibrations of the machine.

A still further object is to provide detachable means for securely locking a tool spindle in operative relation to its driving shaft, while permitting rapid replacement of the spindle without requiring the use of tools.

Other objects and advantages of my invention will become apparent during the course of the following description, reference being had to the accompanying drawings, in which:

Fig. 1 is a vertical section taken through the gear box and upper universal joint, showing one unit of a multiple spindle, adjustable drilling machine;

Fig. 2 is a similar view, to an enlarged scale showing the detachable connection in greater detail; and Figs. 3 and 4 are transverse sectional views taken on the lines 3—3 and 4—4 of Fig. 2.

The figures illustrate the driving shaft and upper universal joint which drive one spindle of a multiple spindle drilling machine. It is contemplated that all the spindles of the machine be driven by similar means.

A drive shaft 12 is journalled in bearings 14 and 16 which are supported at the upper and lower sides of a gear box 18. The portion of the shaft 12 inside the box 18 has a splined connection with a spur pinion 20 which is driven through a train of gears including a meshing spur gear 22. A manually operable device, comprising a vertical rod 24 and a horizontal arm 26 pinned thereto at 28, may be utilized to move the pinion 20 in and out of mesh with the gear 22, the position of the device being maintained by a spring loaded detent 30 cooperating with one of a plurality of grooves 32 in the rod 24.

An extension 34 of the shaft 12 is detachably coupled to a sleeve 36. The sleeve 36 is pinned at 38 to a universal joint yoke 40, which fits snugly into sleeve 36 and has a flange 42 lying against the lower end of the sleeve.

The lower end of yoke 40 is connected by pin 44 to block 46, which in turn is connected by pin 48 to the upwardly extending arms 50 of yoke 52. The axis of pin 48 is at right angles to the axis of pin 44, this connection constituting the upper joint of a universal connection between the driving shaft and the spindle.

The stem 54 of yoke 52 is secured to a sleeve 56 both by a pin 58 and by having a hexagonal perimeter fitted to a complementary hexagonal opening in the upper end of sleeve 56. A keyway 60 is cut in the inner surface of the sleeve 56, and a rod 62, having a key 64 fitting in keyway 60, is thus caused to rotate with the sleeve 56, although the length of the sleeve-rod connection may be adjusted. The lower end of rod 62 is connected to the customary tool carrying spindle by means of a lower universal joint (not shown).

An oil pan 82 is secured by suitable means, as a plurality of hollow-head cap screws 80, to the lower side of the gear box. To prevent escape of the oil through the oil pan opening provided for the driving shaft and universal joint, a thin wall tube 84 may be press-fitted to the oil pan at the lower opening, and a ring 86 may be mounted on shaft 34, serving to prevent oil from entering the upper opening of the tube.

The improved means whereby sleeve 36 is detachably locked to shaft 34 will now be described.

A longitudinal groove 66 cut in the inner wall of sleeve 36 constitutes a keyway, and a Woodruff key 68 fits in keyway 66 and causes the sleeve to rotate with the shaft. The key is longitudinally slidable in the keyway, permitting the disconnection of the shaft and sleeve upon relative axial movement.

To lock sleeve 36 and shaft 34 against relative axial movement, a key 74 is slipped into slot 72 and groove 70 when they have been brought into registry, said slot and groove being cut respectively in the sleeve and shaft transversely to the axis. The form of the key 74 and the complementary slot and groove may be varied. However, I find it particularly convenient to use a Woodruff type key.

The key 74 may be conveniently held in the locked position by a thin cross section C-spring 76. To position the C-spring, I provide a circumferential retaining groove 77 in alignment with the slot 72. The radius of key 74 is slightly less than the outer radius of the sleeve and approximately the same as the inner radius of groove 77, and the C-spring holds the key snugly in position.

The detaching operation is as follows: Assuming, for example, that the machine tool setup is to be changed, the operator first removes the cap screws 80 and lowers the oil pan. He can then disconnect the universal joint from the driving shaft by a very simple method which does not require the use of tools. The C-spring is first removed, the key 74 is slid out of its locking position, and sleeve 36 is pulled vertically downward to disengage keyway 66 from key 68. Because the operation can be performed by hand, it requires a minimum of time. To reassemble the connection the steps of disassembly are performed in reverse order.

The connection, while easily detachable, nevertheless provides a positive and rigid drive for the spindle since the separable parts are positively locked together. All parts of the connection lie within the confines of the external surface of the sleeve 36, and thus the provision of the detachable connection does not make necessary any substantial increase in overall dimensions, as compared with customary constructions.

Although a single embodiment of my invention has been described, I do not intend the scope of invention to be limited to that embodiment, but only by the appended claims.

I claim:

1. For use in a machine tool having a rotating driving element and a spindle driven thereby, and having means connecting the driving element to the spindle, the combination of a sleeve secured to the spindle, a shaft connected to the rotating driving element and extending into said sleeve, said shaft having a transverse segment shaped groove cut in its outer surface, said sleeve having an arcuate transverse slot cut through the wall thereof for alignment with said groove, a key and keyway rotary driving connection between said shaft and said sleeve causing them to rotate together but permitting relative longitudinal movement thereof, a readily removable Woodruff key extending into the transverse slot of said sleeve and into the transverse groove of said shaft to prevent relative longitudinal movement of said shaft and said sleeve, and a manually releasable split resilient sleeve holding said Woodruff key in said position.

2. In a machine tool, the combination of a spindle driving sleeve, a driving shaft extending into said sleeve, said shaft having a transverse groove cut in its outer surface, said sleeve having a transverse slot cut through the wall thereof, a key and keyway connection between said shaft and the sleeve causing them to rotate together, a readily removable Woodruff key extending into both the transverse slot of the sleeve and the transverse groove of the shaft, and a resilient split retaining sleeve holding the Woodruff key in position.

3. A releasable connection for driving and driven rotating elements comprising, a sleeve which rotates with one of the elements, a shaft which rotates with the other of the elements and which extends into the sleeve, said shaft and sleeve being caused to rotate together by a key associated with one of them and a longitudinal keyway formed in the other, said sleeve having a transverse slot cut through the wall thereof and a circumferential groove cut into the outer surface thereof in alignment with the slot, said shaft having a transverse segmental groove therein, a locking member extending into both the transverse slot of the sleeve and the transverse groove of the shaft, and a C-spring snapped into the groove of the outer surface of the sleeve to hold the locking member in position.

ROBERT A. SCHAFER.

REFERENCES CITED

The following references are of record in the file of this patent:

UNITED STATES PATENTS

| Number | Name | Date |
|---|---|---|
| 289,627 | Crabtree | Dec. 4, 1883 |
| 544,068 | Oehring | Aug. 6, 1895 |
| 666,509 | Furbish | Jan. 22, 1901 |
| 688,860 | Kay et al. | Dec. 17, 1901 |
| 1,003,493 | Newmann | Sept. 19, 1911 |
| 1,212,472 | Fox | Jan. 16, 1917 |
| 1,296,042 | Bralove | Mar. 4, 1919 |
| 1,781,109 | Herzberg et al. | Nov. 11, 1930 |
| 1,933,157 | Baer | Oct. 31, 1933 |

FOREIGN PATENTS

| Number | Country | Date |
|---|---|---|
| 275,514 | Great Britain | Aug. 11, 1927 |